United States Patent [19]

Yamashita

[11] Patent Number: 5,063,466
[45] Date of Patent: Nov. 5, 1991

[54] ROTARY HEAD TYPE MAGNETIC RECORDING AND REPRODUCING APPARATUS

[75] Inventor: Tatsumaro Yamashita, Shibata, Japan

[73] Assignee: Alps Electric Co., Ltd., Tokyo, Japan

[21] Appl. No.: 441,684

[22] Filed: Nov. 22, 1989

[30] Foreign Application Priority Data

Dec. 5, 1988 [JP] Japan .................................. 63-308460

[51] Int. Cl.⁵ .............................................. G11B 5/52
[52] U.S. Cl. ...................................... 360/107; 360/84
[58] Field of Search ............................ 360/107, 84–85

[56] References Cited

U.S. PATENT DOCUMENTS

| 4,389,680 | 6/1983 | Gramling | 360/107 X |
| 4,535,367 | 8/1985 | Kanda | 360/84 |
| 4,766,507 | 8/1988 | Kashida et al. | 360/72.2 |

FOREIGN PATENT DOCUMENTS

| 0049989A2 | 4/1982 | European Pat. Off. . |
| 0059453A1 | 9/1982 | European Pat. Off. . |
| 0128577A2 | 12/1984 | European Pat. Off. . |
| 2121229A | 12/1983 | United Kingdom . |

Primary Examiner—John H. Wolff
Attorney, Agent, or Firm—Guy W. Shoup; David W. Heid

[57] ABSTRACT

Disclosed is a rotary heat type magnetic recording and reproducing apparatus for a digital audio tape player, comprising a rotary drum, head amplifiers, reproducing signal processing circuit and a recording signal processing circuit, the rotary drum including a pair of magnetic heads for recording and reproduction and a pair of magnetic head for reproduction alone.

12 Claims, 2 Drawing Sheets

ROTARY HEAD TYPE MAGNETIC RECORDING AND REPRODUCING APPARATUS

BACKGROUND OF THE INVENTION

1. Field of the Invention

The present invention relates to a rotary head type magnetic recording and reproducing apparatus for a DAT (Digital Audio Tapeplayer) or the like, and particularly, to a rotary head type magnetic recording and reproducing apparatus which is for reading data at a high rate in a high speed search mode.

2. Description of the Prior Art

FIG. 3 is a plan view showing a magnetic tape T used for a conventional rotary head type DAT, as viewed from the outside of a drum winding (the recording states from a recording surface are shown in perspective).

In a tape player of this kind, a magnetic head for recording and reproduction mounted on a rotary head drum scans a recording surface of a magnetic tape T in a direction as indicated by arrow $\alpha$ to carry out writing or reproduction of information on track 1.

During a high speed search operation, data recorded in subcode areas 2a and 2b are read as follows. As shown in FIG. 3, the tape travels at high speeds in direction REW (in a direction opposite the direction of recording and reproduction). The rotary drum is rotated with a rotational frequency such that the relative speed of the magnetic head provided on the rotary head drum and the magnetic tape in track direction $\alpha$ is constant. Generally, a noise bar read when the magnetic head scans a track having a different azimuth angle is used as a reference to set the rotational frequency of the rotary drum.

In this case, the magnetic head scans at a shallow angle as indicated by arrow $\beta$ with respect to the magnetic tape. Data 3a and 3b recorded in sub-code areas 2a and 2b in each track are read by the magnetic head which scans along line $\beta$.

However, in the conventional rotary head type magnetic recording and reproducing apparatus for DAT, two magnetic heads mounted on the rotary drum at an angle of 180° are used for the high speed search. A winding angle of the magnetic tape with respect to the rotary drum is approximately 90°. Accordingly, each magnetic head scans the magnetic tape every 90° rotation of the rotary drum. That is, the magnetic head merely scans the area indicated by hatching in FIG. 3 and does not scan other areas.

The portion of the sub-code area 2a from which the magnetic head is jumped during the high speed search increases with the travelling speed of the magnetic tape and the rotational frequency of the rotary drum. For example, in case of providing audio data or other PCM data, Start-ID or PNO showing the music number are normally recorded only in frame 300 from the head of information. Therefore, when the sub-code jumped during the high speed search exceeds 300 frames, reading that information during the high speed search becomes impossible. In the case where two blocks such as Priority-ID and Pack-ID have to be continuously read, when the tape travelling speed is too high in the high speed search shown in FIG. 3, two blocks cannot be read continuously.

As described above, in the conventional apparatus, when the tape speed is made to be higher unconditionally, sub-code data cannot be read reliably by the search operation. There is a limitation in making the search operation faster. For example, in DAT using a head drum having a diameter of 30 mm, the high speed search is limited to approximately 200 times normal speed.

SUMMARY OF THE INVENTION

The aforesaid problems have been solved by the present invention. Its object is to provide a rotary head type magnetic recording and reproducing apparatus which can widen the tape area that may be scanned by a magnetic head in a high speed search mode to make possible a high speed searching operation with high accuracy.

For achieving the aforesaid object, a rotary head type magnetic recording and reproducing apparatus according to the present invention comprises a rotary drum which comes in contact with a magnetic tape drawn out of a cassette half, said rotary drum including a pair of magnetic heads for recording and reproduction and a pair of magnetic heads for reproduction alone, head amplifiers connected in a state capable of reading signals by both said magnetic heads for recording and reproduction and said magnetic heads for reproduction alone in a high speed search mode wherein the magnetic tape travels at a speed higher than that during recording, and a reproduced signal processing circuit.

According to the present invention, in the high speed search mode, the magnetic tape is scanned by the four magnetic heads, i.e., the pair of the magnetic heads for recording and reproduction and the pair of magnetic heads for reproduction alone provided on the rotary drum. The unattached area in FIG. 3 is also scanned by one of the magnetic heads, so the probability of reading data recorded in the sub-code area is twice that of the prior art. Thereby, in the high speed search mode, the data recorded in the sub-code area can be reproduced with higher accuracy than in the prior art to increase the reliability of the high speed search. Moreover, even if the tape travelling speed is made faster than that of the high speed search mode, a probability of skipping over sub-code data by a magnetic head is lowered to enhance the than in the prior art.

DETAILED DESCRIPTION OF THE PREFERRED EMBODIMENT

The preferred embodiment of the present invention is described below.

Figure 1:
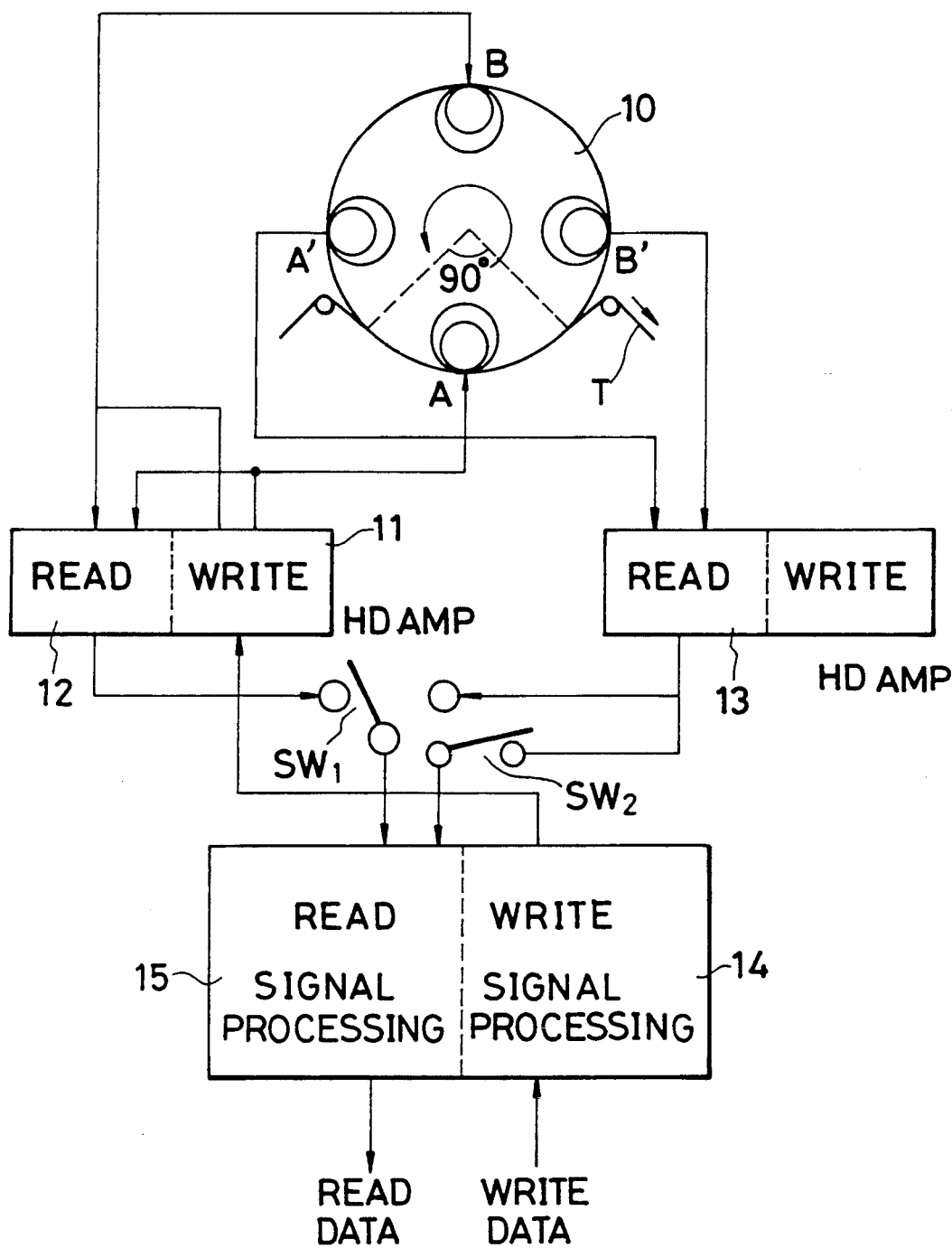
FIG. 1 is a block diagram of a circuit for a rotary head type magnetic recording and reproducing apparatus according to the preferred embodiment of the present invention.

FIG. 1 is a block diagram of a circuit showing a rotary head type magnetic recording and reproducing apparatus according to the present invention.

In FIG. 1, reference numeral 10 designates a rotary drum. The rotary drum 10 has a pair of magnetic heads A and B for recording and reproduction and a pair of magnetic heads A' and B' for reproduction alone mounted thereon. The magnetic heads A and B for recording and reproduction are mounted at an angle of 180° from each other while the magnetic heads A' and B' for reproduction alone are mounted 90° from the magnetic heads A and B, respectively. The magnetic heads A' and B' for reproduction alone are used for read-after-write operation during the recording operation. That is, the data recorded by the magnetic heads A and B is read immediately by the magnetic heads A' and B' for reproduction alone to effect error monitoring of the recording operation. In the high speed search mode, reading operation is carried out by the four heads A, B and A', B'.

In FIG. 1, a recording head amplifier 11 and a reproducing head amplifier 12 are connected to the magnetic heads A and B for recording and reproduction. A reproducing head amplifier 13 is connected to the magnetic heads A' and B' for reproduction alone. Reference numeral 14 denotes a recording signal processing circuit. Recording data from a buffer memory or the like is inputted into the processing circuit 14 where they are put into a format in which they are to be recorded on the tape, that is, a format such as ATF. Reference numeral 15 designates a reproduced signal processing circuit. The data read by the magnetic head are processed by the reproduced signal processing circuit 15 and sent to a buffer memory or the like.

The data from the reproducing head amplifier 12 and the head amplifier 13 are multiplexed to the signal processing circuit 15 by means of a switch $SW_1$. The input of a reproduced signal from the reproducing head amplifier 13 to the reproduced signal processing circuit 15 is supplied via a switch $SW_2$.

The operation of the apparatus is described hereinafter.

As shown in FIG. 1, the magnetic tape T comes into contact with the rotary drum 10 at a winding angle of approximately 90°. In the recording operation, the data outputted from the recording signal processing circuit 14 are amplified by the recording head amplifier 11 and recorded on the magnetic tape T by the magnetic heads A and B. At this time, the switch $SW_1$ has been switched to the head amplifier 13, and the data recorded by the magnetic heads A and B are immediately read by the magnetic heads A' and B' for reproduction alone and inputted into the reproduced signal processing circuit 15. The data recorded on the magnetic tape T is monitored to determined whether or not the content thereof is correct in accordance with the reproduced data.

In the reproduction operation, the switch $SW_1$ is switched to the head amplifier 12, whereby the data read by the magnetic heads A and B are inputted into the reproduced signal processing circuit 15, where the data are processed and sent to the buffer memory.

Next, the high speed search mode will be described.

Figure 2:
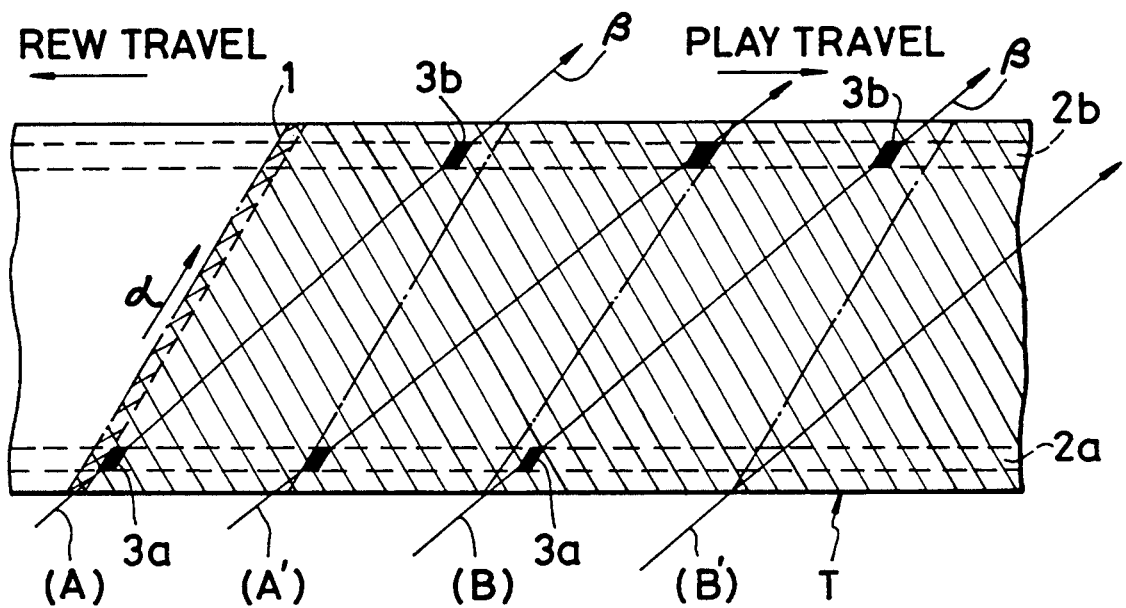
FIG. 2 is an enlarged view of a recording surface of a magnetic tape showing lines along which a magnetic head scans said surface during a high speed search carried out by the rotary head type magnetic recording and reproducing apparatus according to the present invention.

In the high speed search mode, the magnetic tape is delivered at a higher speed than that of the normal recording and reproduced mode. FIG. 2 shows a search mode operation in the case where a magnetic tape travels at a high speed in direction REW. At this time, the magnetic heads A, B, A' and B' scan the tape along the lines $\beta$. The rotational frequency of the rotary drum 10 is controlled so that the relative speed of the magnetic head and the magnetic tape in track direction $\alpha$ is constant.

Figure 3:
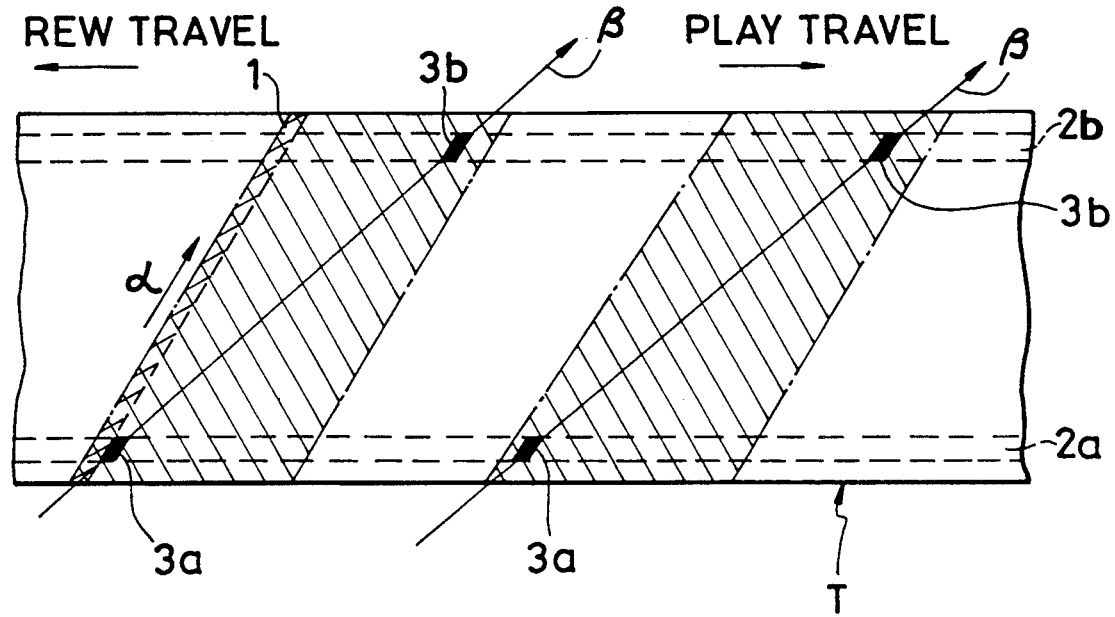
FIG. 3 is an enlarged view of a recording surface of a magnetic tape showing a high speed search operation by a prior art rotary head type magnetic recording and reproducing apparatus.

In the embodiment shown in FIG. 1, in the high speed search mode, the switch $SW_1$ is switched to the head amplifier 12 and the switch $SW_2$ is energized so that read signals can be inputted from both reproducing head amplifiers 12 and 13 into the reproduced signal processing circuit 15. As a result, the read signals from the magnetic heads A and B for recording and reproduction and the magnetic heads A' and B' for reproduction alone are processed by the signal processing circuit 15. As shown in FIG. 2, in the high speed search mode, the read signals can be obtained from all these magnetic heads A, B, A' and B', and therefore, the areas not scanned by the magnetic heads in the prior art shown in FIG. 3 (portions not indicated by hatching in FIG. 3) get scanned in this invention.

Since almost the entire area of the recording surface of the magnetic tape is read by means of the four magnetic heads, the probability of reading data of the sub-code areas $2a$ and $2b$ is twice that in the prior art and so the high speed seach is more reliable. Furthermore, since the quantity of sub-code data to be skipped over during the high speed search is reduced, even if the tape travelling speed is made greater than in the prior art, failure in reproduction of Start-ID or the like is eliminated and so the high speed search operation can be accomplished. Moreover, since reproduction RF signals are read by the four magnetic heads continuously, a noise bar will be read immediately as a result if one of the magnetic heads crosses to a track at a different azimuth angle, thus enhancing the accuracy control of a drum servo on the basis of the reproduced signal.

It is to be noted that the present invention is applied not only to the magnetic tape for DAT in which music information is recorded but also where a magnetic tape for DAT is used to record data for various computers.

As described above, according to the present invention, since the reading operation is carried out by four magnetic heads in the high speed search mode, the accuracy of the high speed search can be increased. Moreover, since the probability of reading sub-code data is doubled, the tape travelling speed in the high speed search mode can be increased.

What is claimed is:

1. A rotary head type magnetic recording and reproducing apparatus for use with a magnetic tape having index information comprising:

a rotary drum adapted for contacting the magnetic tape;

a pair of magnetic heads for recording and reproduction mounted on said rotary drum;

a pair of magnetic heads for reproduction alone mounted on said rotary drum;

head amplifiers connected to said heads for reading the index information by both said magnetic heads for recording and reproduction and said magnetic heads for reproduction alone in a high speed search mode; and a reproduced signal processing circuit connected to said head amplifiers.

2. An apparatus according to claim 1 which further comprises a recording signal processing circuit for receiving data to be recorded from buffer memory.

3. An apparatus according to claim 1, wherein the magnetic heads for recording and reproduction are arranged along a periphery of said drum at an angle of 180° from one another, and the magnetic heads for reproduction alone are arranged along the periphery of said drum at an angle of 180° from one another and at a position of 90° with respect to said magnetic heads for recording and reproduction.

4. An apparatus as in claim 1, further comprising means for comparing an incoming signal recorded on said tape by said magnetic heads for recording and reproduction with a reproduction thereof by said magnetic heads for reproduction alone, for verifying said recorded incoming signal.

5. A rotary head type magnetic recording apparatus for use with magnetic tape having index information comprising:
   a rotary drum adapted for contact with the magnetic tape;
   a first group of heads mounted on said rotary drum for selectively recording signals on said tape and reproducing signals recorded on said tape; and
   a second group of heads mounted on said rotary drum for reproduction alone of signals recorded on said tape; wherein the heads of said first and second groups are arranged in alternating subgroups.

6. An apparatus as in claim 5, further comprising means for comparing an incoming signal recorded on said tape by said heads of said first group with a reproduction thereof by said heads of said second group, for verifying said recorded incoming signal.

7. An apparatus as in claim 6, further comprising amplifying means connected to said heads of said first and second groups for amplifying said incoming signals to be recorded by said heads of said first group and signals reproduced by said heads of said first and second groups.

8. An apparatus as in claim 5, wherein:
   said first group comprises at least two heads;
   said second group comprises at least two heads;
   between any two heads of said first group adjacent to each other on the circumference of said rotary drum, there is one and only one head of said second group;
   the distance between any two adjacent heads of said first group along the circumference of said rotary drum is the same for all pairs of adjacent heads of said first group; and
   the positions of said heads of said second group are at a selected angle from the positions of said heads of said first group in a selected direction along the periphery of said rotary drum.

9. An apparatus as in claim 8, wherein the positions of said heads of said first group are at said selected angle from the positions of said heads of said second group in said selected direction along the periphery of said rotary drum.

10. A rotary head type magnetic recording and reproducing apparatus for use with magnetic tape having first and second data areas, said apparatus comprising:
    a rotary drum adapted for contact with the magnetic tape;
    a first group of magnetic heads mounted on said rotary drum for recording on and reproducing from said first data areas when said apparatus is operated in a first mode, and for reproducing from said second data areas when said apparatus is operated in a second mode; and
    a second group of magnetic heads mounted on said rotary drum for reproducing from said first data areas when said apparatus is operated in said first mode and for reproducing from said second data areas when said apparatus is operated in said second mode.

11. An apparatus of claim 10, wherein:
    said first group comprises at least two heads;
    said second group comprises at least two heads;
    between any two heads of said first group adjacent to each other on the circumference of said rotary drum, there is one and only one head of said second group;
    the distance between any two adjacent heads of said first group along the circumference of said rotary drum is the same for all pairs of adjacent heads of said first group; and
    the positions of said heads of said second group are at a selected angle from the positions of said heads of said first group in a selected direction along the periphery of said rotary drum.

12. An apparatus of claim 10 wherein said first mode is a normal operating mode, and said second mode is a high-speed search mode.

* * * * *